United States Patent [19]

Takahashi et al.

[11] 4,232,638
[45] Nov. 11, 1980

[54] INTERNAL COMBUSTION ENGINE EQUIPPED WITH AN AUXILIARY COMBUSTION CHAMBER

[75] Inventors: Takeshi Takahashi, Susono; Hiromichi Yanagihara, Gotenba, both of Japan

[73] Assignee: Toyota Jidosha Kogyo Kabushiki Kaisha, Toyota, Japan

[21] Appl. No.: 14,163

[22] Filed: Feb. 22, 1979

[30] Foreign Application Priority Data

May 11, 1978 [JP] Japan .................. 53/54963

[51] Int. Cl.³ ........................................ F02B 19/10
[52] U.S. Cl. .................................... 123/260; 123/261;
123/263; 123/293; 123/285; 123/275
[58] Field of Search .............. 123/32 F, 32 G, 32 L,
123/32 SP, 32 ST, 32 C, 32 D, 30 D, 191 S, 191 SP

[56] References Cited

U.S. PATENT DOCUMENTS

| | | | |
|---|---|---|---|
| 2,204,068 | 6/1940 | Chapman | 123/32 C |
| 2,893,360 | 7/1959 | Müller | 123/32 F |
| 2,914,043 | 11/1959 | Nallinger | 123/32 SP |
| 3,824,965 | 7/1974 | Clawson | 123/32 SP |
| 3,977,367 | 8/1976 | Roberts | 123/32 F |
| 4,149,495 | 4/1979 | Miura | 123/32 SP |

FOREIGN PATENT DOCUMENTS

| | | | |
|---|---|---|---|
| 1914742 | 10/1970 | Fed. Rep. of Germany | 123/32 G |
| 72509 | 6/1953 | Netherlands | 123/32 F |
| 40021 | 9/1913 | Sweden | 123/32 F |

*Primary Examiner*—Charles J. Myhre
*Assistant Examiner*—Andrew M. Dolinar
*Attorney, Agent, or Firm*—Stevens, Davis, Miller & Mosher

[57] ABSTRACT

An internal combustion engine comprising an auxiliary chamber connected to a main chamber via a connecting passage. A raised portion is formed on the inner wall of the auxiliary chamber. The auxiliary chamber is divided into a first chamber and a second chamber. The connecting passage is tangentially connected to the inner wall of the second chamber at a position opposite to the raised portion with respect to the axis of the auxiliary chamber. A fuel injector having a pair of injection nozzles is arranged in the first chamber. One of the injection nozzles is directed to the tip of the raised portion. The other nozzle is directed to the inner wall of the auxiliary chamber, which is located at a position opposite to the raised portion with respect to the axis of the auxiliary chamber. The fuel is always injected from the nozzle towards the tip of the raised portion independently of the operating condition of the engine, while the injecting operation of the other nozzle is started when the load of the engine is increased beyond a predetermined level.

12 Claims, 9 Drawing Figures

INTERNAL COMBUSTION ENGINE EQUIPPED WITH AN AUXILIARY COMBUSTION CHAMBER

DESCRIPTION OF THE INVENTION

The present invention relates to a fuel injector of an internal conbustion engine equipped with an auxiliary chamber.

The present inventor has proposed an internal combustion engine which is provided with an auxiliary chamber connected to a main chamber via a connecting passage and having a volume which is more than 80 percent relative to the total volume of the main and the auxiliary chambers. In this engine, the auxiliary chamber comprises a first and a second auxiliary chamber arranged in tandem on the axis of the auxiliary chamber and divided by a raised portion formed on the inner wall of the auxiliary chamber. The connecting passage is connected tangentially to the inner wall of the second auxiliary chamber which is located at a position near the main chamber, and the raised portion is formed on the inner wall of the auxiliary chamber, which is located at a position opposite to the inner wall to which the connecting passage is tangentially connected. The spark plug is arranged in a recess formed beneath the raised portion in the second auxiliary chamber, and the fuel injector having a single fuel injection nozzle is arranged in the auxiliary chamber so as to form a rich air-fuel mixture in the recess. In this engine, during the intake stroke, the suction gas consisting of air or a lean air-fuel mixture, or the suction gas containing recirculated exhaust gas therein is introduced into the main chamber. Then, during the compression stroke, the suction gas in the main chamber is forced into the auxiliary chamber via the connecting passage. At this time, since the connecting passage is connected tangentially to the inner wall of the auxiliary chamber as mentioned above, the swirl motion of the suction gas is created in the auxiliary chamber. Then, fuel is injected from the fuel injector towards the suction gas swirling in the auxiliary chamber so that a rich air-fuel mixture is formed in the recess. After this, the rich air-fuel mixture in the recess is ignited by the spark plug and, then, burned gas is injected into the main chamber via the connecting passage.

However, in such an engine, when the level of the load of an engine is increased and, accordingly, the amount of fuel injected from the fuel injector is increased, since a large amount of the residual exhaust gas created in the preceding cycle remains in the recess, the mixture formed in the recess becomes excessively rich. This results in a problem in that, since carbons adhere onto the electrode of the spark plug, the electric current is leaked to the ground through the carbons and, thus, the ignition energy is considerably reduced. In order to avoid this problem, many experiments have been repeatedly conducted by the inventor by changing the injecting direction of the fuel injected from the single nozzle of the fuel injector. However, as a result of such experiments, the inventor has proven that it is difficult to form a mixture of the optimum air-fuel ratio in the recess around the electrode of the spark plug over the entire range operating conditions of an engine by merely changing the injecting direction of the single nozzle of the fuel injector.

An object of the present invention is to provide an internal combustion engine having a fuel injector capable of preventing a reduction in the output power of an engine caused by a reduction in the ignition energy.

According to the present invention, there is provided an internal combustion engine comprising: a cylinder block having a cylinder bore therein; a piston reciprocally movable in said cylinder bore; a cylinder head fixed onto said cylinder block and forming therein an auxiliary chamber having an axis, said cylinder head and said piston defining a main chamber therebetween; a raised portion formed on an inner wall of said auxiliary chamber and dividing said auxiliary chamber into a first auxiliary chamber and a second auxiliary chamber; a connecting passage communicating said main chamber with said auxiliary chamber and tangentially connected to an inner wall of said second auxiliary chamber, which is located at a position opposite to said raised portion with respect to the axis of said auxiliary chamber; a spark plug arranged in a recess formed beneath said raised portion in said second auxiliary chamber, and; a fuel injector arranged in said first auxiliary chamber and having a first injection nozzle and a second injection nozzle, said first injection nozzle being directed to a tip of said raised portion and always injecting fuel independently of operating condition of the engine for forming a rich air-fuel mixture in said recess, said second injection nozzle injecting fuel when the load of the engine is increased beyond a predetermined level and being directed to the inner wall of said auxiliary chamber, which is located at a position opposite to said raised portion with respect to the axis of said auxiliary chamber.

The present invention may be more fully understood from the description of preferred embodiments of the invention presented below, together with the accompanying drawings.

DESCRIPTION OF PREFERRED EMBODIMENTS

Figure 1:
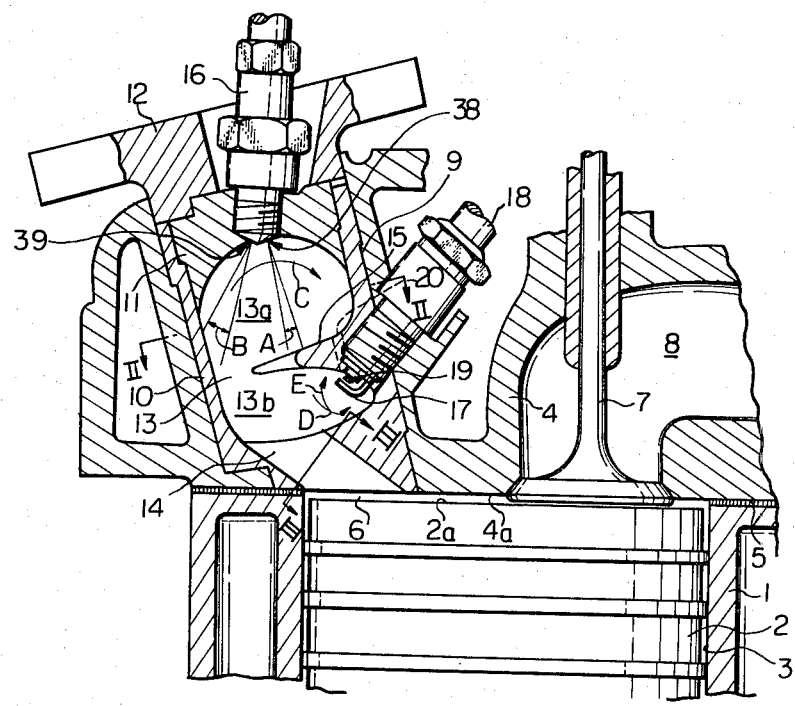
FIG. 1 is a cross-sectional side view of an engine according to the present invention.
Figure 2:
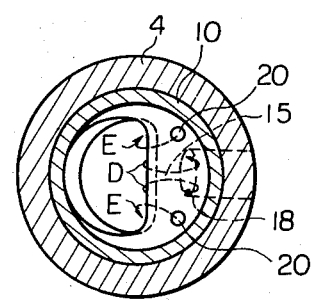
FIG. 2 is a cross-sectional view taken along the line II—II in FIG. 1.
Figure 3:
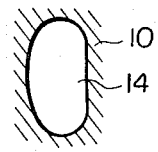
FIG. 3 is a cross-sectional view taken along the line III—III in FIG. 1.

Referring to FIGS. 1 and 2, 1 designates a cylinder block, 2 a piston having a flat top face 2a and reciprocally moving in a cylinder bore 3, and 4 a cylinder head having a flat inner wall 4a and fixed onto the cylinder block 1 via a gasket 5; 6 designates a main chamber, 7 an intake valve and 8 an intake port. An exhaust valve (not shown) in also provided, in addition to the intake valve 7. A hole 9 having a circular cross-section is formed in the cylinder head 4, and an auxiliary chamber component 10 is fitted into the hole 9. In addition, another auxiliary chamber component 11 is fitted into the upper portion of the auxiliary chamber component 10. The auxiliary chamber components 10 and 11 are rigidly fixed onto the cylinder head 4 by means of a fixing plate 12 which is fixed onto the cylinder head 4 by means of bolts (not shown). An auxiliary chamber 13 is formed in the auxiliary chamber components 10 and 11 and is connected to the main chamber 6 via a connecting passage 14 formed in the auxiliary chamber component 10. In addition, the total volume of the volume of the auxiliary chamber 13 and the volume of the connecting passage 14 is set so as to be more than 80 percent relative to the total volume of the volume of the auxiliary chamber 13, the volume of the connecting passage 14 and the volume of the main chamber 6 at the time when the piston 2 is positioned in the top dead center as shown in FIG. 1.

A raised portion 15 is formed on the inner wall of the auxiliary chamber 13, which is located at a position opposite to the inner wall to which the connecting passage 14 is tangentially connected. The auxiliary chamber 13 is divided into a first auxiliary chamber 13a and a second auxiliary chamber 13b by the raised portion 15. As is illustrated in FIGS. 1 and 2, the raised portion 5 extends to an approximate center of the auxiliary chamber 13. The upper end of the connecting passage 14 is connected tangentially to the inner wall of the second auxiliary chamber 13b, and the lower end of the connecting passage 14 opens into the periphery of the main chamber 6. A fuel injector 16 having a pair of fuel injection nozzles is arranged at the apex of the first auxiliary chamber 13a, so that one of the fuel injection nozzles is directed to the tip of the raised portion 15, as shown by the range A in FIG. 1, while the other fuel injection nozzle is directed to the inner wall of the auxiliary chamber 13, which is located at a position opposite to the raised portion 15, as shown by the range B in FIG. 1. A recess 17 is formed beneath the raised portion 15, and an electrode 19 of a spark plug 18 is arranged at the center of the upper interior of the recess 17. A pair of auxiliary connecting passages 20 communicating the first auxiliary chamber 13a with the recess 17 is formed on the raised portion 15 at a position near the inner wall of the auxiliary chamber 13. In addition, these auxiliary connecting passages 20 are spaced from each other and arranged on each side of the spark plug 18 so that each of the auxiliary connecting passages 20 opens into the recess 17 at a position remote from the spark plug 18, as shown in FIG. 2. Since the engine illustrated in FIG. 1 is provided with no throttle valve, the intake port 8 is directly connected to an air cleaner (not shown) or connected to the air cleaner via a carburetor (not shown) used for feeding a lean air-fuel mixture into the main chamber 6. Therefore, in this engine, the regulation of the load of the engine is carried out by regulating the amount of fuel injected from the fuel injector 16. In addition, exhaust gas may be recirculated into the intake port 8.

Figure 4:
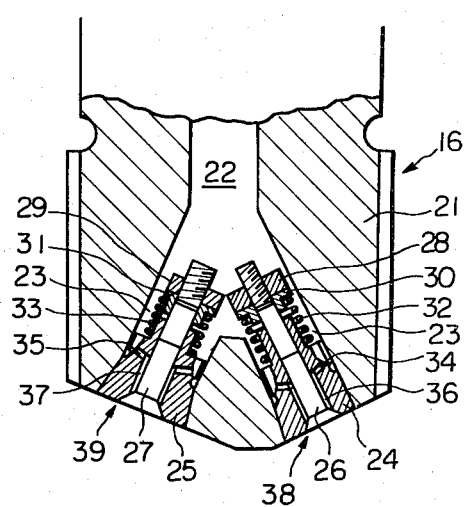
FIG. 4 is an enlarged cross-sectional side view of a part of an embodiment of the fuel injector shown in FIG. 1.
Figure 5:
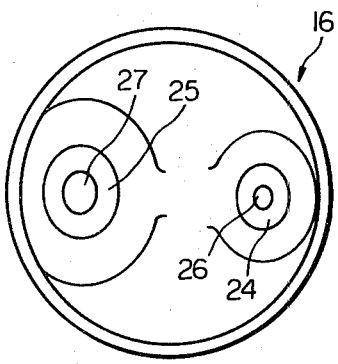
FIG. 5 is a bottom view of the fuel injector shown in FIG. 4.

FIG. 4 is an enlarged cross-sectional view of the tip of the fuel injector illustrated in FIG. 1, and FIG. 5 is a bottom view of the fuel injector illustrated in FIG. 4 Referring to FIGS. 4 and 5, the fuel injector 16 has in its housing 21 a common fuel supply passage 22 and a pair of fuel supply branches 23, and the common fuel supply passage 22 is connected to a fuel injection pump (not shown) driven by the engine. Valve seats 24 and 25 are screwed into the lower ends of the corresponding fuel supply braches 23, and movable needles 26 and 27 are slidably mounted on the valve seats 24 and 25, respecively. Spring retainers 28 and 29 are fixed onto the upper ends of the needles 26 and 27, respectively, and compression springs 32 and 33 are inverted between the valve seats 24 and 25 and spring seats 30 and 31 which rest on the valve retainers 28 and 29, respectively. Each of the needles 26 and 27 is always urged upward due to the spring force of the respective compression spring 32, 33, and the needles 26 and 27 open when the pressure of the fuel in the fuel supply branches 23 is increased beyond a predetermined level. At that time, the fuel in the fuel supply branches 23 is injected into the auxiliary chamber 13 from fuel injection nozzles 38, 39 as shown by the ranges A, B (in FIG. 1) via fuel passages 34, 35 formed in the valve seats 24, 25 and via annular fuel passages 36, 37 formed between the valve seats 24, 25 and the needles 26, 27. From FIG. 4, it will be understood that the fuels are injected from the fuel injection nozzles 38, 39 in directions away from each other with respect to the axis of the fuel injector 16.

In the fuel injector 16 according to the present invention, while the compression spring 32 has the same spring constant as that of the compression spring 33, the compression springs 32 and 33 are preloaded when they are mounted between the valve seats 24, 25 and the spring seats 30, 31 so that the preloaded spring force of the compression spring 33 of the needle 27 is greater than that of the compression spring 32 of the needle 26. In addition, the needles 26 and 27 are so formed that the opening cross-sectional area of the fuel injection nozzle 39, which is formed when the needle 27 opens, is considerably larger than that of the fuel injection nozzle 38, which is formed when the needle 26 opens. Consequently, when the amount of the fuel injected from the fuel injector 16 is small, since only the needle 26 preloaded with a weaker spring force opens, the fuel is injected only from the fuel injection nozzle 38. On the other hand, when the amount of the fuel injected from the fuel injector 16 is increased, since the amount of the fuel injected via the needle 26 having a smaller opening cross-section is saturated immediately after the injecting operation is started, the pressure of the fuel in the fuel supply branches 23 is increased. As a result of this, the needle 27 preloaded with a stronger spring force opens and, thus, the fuel is injected from the fuel injection nozzle 39. As mentioned above, the fuel injection nozzle 39 has an opening cross-sectional area which is considerably larger than that of the fuel injection nozzle 38. Consequently, once the needle 27 opens the fuel injection nozzle 39, the fuel can more easily pass through the fuel injection nozzle 39 rather than the fuel injection nozzle 38. In addition, the opening cross-sectional area of the fuel injection nozzle 39 is increased as the amount of the fuel injected from the fuel injector 16 is increased. As a result, the larger the amount of the fuel injected from the fuel injector 16 becomes, the more easily the fuel can pass through the fuel injection nozzle 39. Therefore, the amount of the fuel injected from the fuel injection nozzle 38 is reduced as the amount of the fuel injected from both the fuel injection nozzles 38 and 39 is increased as indicated in FIG. 6.

Figure 6:
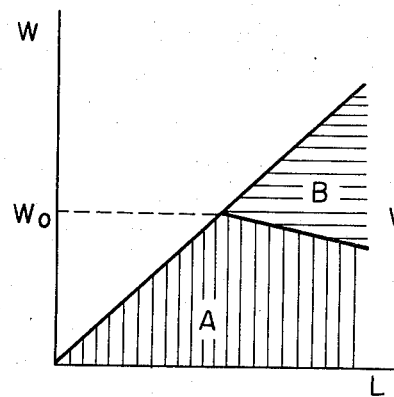
FIG. 6 is a graph showing the change in an amount of the fuel injected from a fuel injector.
Figure 7:
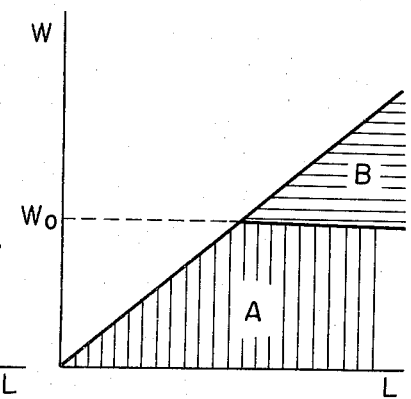
FIG. 7 is a graph showing the change in an amount of the fuel injected from a fuel injector.
Figure 8:
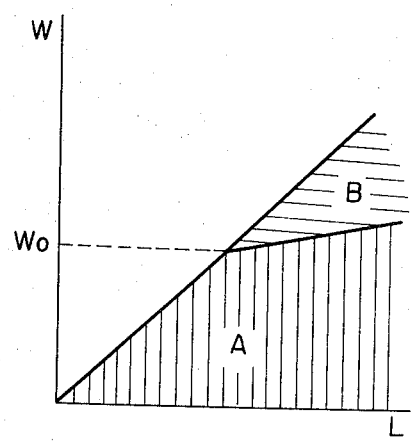
FIG. 8 is a graph showing the change in an amount of the fuel injected from a fuel injector.

In FIG. 6, the ordinate W indicates the amount of the fuel injected from the fuel injector, and the abscissa L indicates the level of the load of the engine. In addition, in FIG. 6, the region A shown by the vertical hatching indicates the amount of the fuel injected from the fuel injection nozzle 38, and the region B shown by the horizontal hatching indicates the amount of the fuel injected from the fuel injection nozzle 39. From FIG. 6, it will be understood that, when the amount of fuel W injected from the fuel injector is increased beyond a predetermined level Wo, the needle 27 opens and, then, the amount of the fuel injected from the fuel injection nozzle 38 and indicated by the hatching A is gradually reduced as the amount of the fuel injected from the fuel injection nozzle 39 and indicated by the hatching B is increased. The fuel injection ratio of the amount of the fuel injected from the fuel injection nozzle 38 to the amount of the fuel injected from the fuel injection nozzle 39 can be changed freely to some extent by changing the preloaded spring force of the compression springs 32, 33 and by changing cross-sectional opening area of the needles 26, 27. For example, by reducing the cross-sectional opening area of the needle 27 as compared with the case shown in FIG. 4, the amount of the fuel injected from the fuel injection nozzle 38 may be maintained at a constant level Wo when the amount of the fuel injected from the fuel injector 16 is increased beyond a predetermined level Wo as shown in FIG. 7. In addition, by further reducing the cross-sectional opening area of the needle 27, when the amount of the fuel injected from the fuel injector 16 is increased beyond a predetermined level Wo, the amount of the fuel injected from the fuel injection nozzle 38 may be increased as the amount of the fuel injected from the fuel injection nozzle 39 is increased as shown in FIG. 8.

Referring again to FIG. 1, in operation, during the intake stroke, a suction gas consisting of air or a lean air-fuel mixture, or a suction gas containing recirculated exhaust gas therein is introduced into the main chamber 6 via the intake valve 7. Then, during the compression stroke, the suction gas in the main chamber 6 is forced into the auxiliary chamber 13 via the connecting passage 14. The suction gas forced into the auxiliary chamber 13 passes through the second auxiliary chamber 13b and then enters into the first auxiliary chamber 13a, thus causing a strong swirl motion as shown by the arrow C in the first auxiliary chamber 13a. On the other hand, a swirl motion as shown by the arrow D is caused in the recess 17 by the strong swirl motion C. The injecting operation of the fuel injector 16 is started when the piston reaches approximately bottom dead center at the beginning of the compression stroke and, then, this injecting operation is completed at approximately 120 degrees before top dead center. In this injecting operation, as mentioned previously, the fuel is injected from the fuel injector 16 only towards the tip of the raised portion 15, as shown by the range, A, when the engine is operating under a light load, while the injecting operation of the additional fuel, shown by the range B, is started when the level of the load of an engine is increased. The fuel impinging upon the tip of the raised portion 15 is led into the recess 17 by the strong swirl motion D to form a rich air-fuel mixture in the recess 17. On the other hand, when the compression stroke advances and, thus, the strong swirl motion C of a lean air-fuel mixture is created in the first auxiliary chamber 13a, a part of the lean air-fuel mixture swirling as shown by the arrow C enters into the recess 17 via the auxiliary connecting passages 20. As a result of this, a pair of swirl motions E which rotate in a direction opposite to the rotating direction of the swirl motion D is created in the opposite ends of the recess 17. These swirl motions E are stronger than the swirl motion D which is caused by the swirl motion C. Each of the swirl motions E moves towards the swirling rich air-fuel mixture D located around the spark plug 18 as the compression stroke advances. As a result of this, the residual exhaust gas located around the spark plug 18 is scavenged by the swirling lean air-fuel mixture E and, at the same time, the rich air-fuel mixture located around the spark plug 18 is diluted by the swirling lean air-fuel mixture E. As is hereinbefore described with reference to FIG. 6, the amount of the fuel injected from the fuel injector 16 towards the tip of the raised portion 15 is saturated when the load of an engine is increased beyond a predetermined level. Consequently, even if the total amount of the fuel injected from the fuel injector 16 is increased, there is no danger that the mixture formed in the recess 17 will become excessively rich. In addition, due to the above-mentioned diluting action of the swirling lean air-fuel mixture, a mixture having an optimum air-fuel ratio is formed in the recess 17. As a result of this, ease of ignition of the spark plug 18 can be ensured and, at the same time, a reduction in ignition energy of the spark plug 18 can be prevented. While a part of the flame of the rich air-fuel mixture located in the recess 17 and ignited by the spark plug 18 is injected into the main chamber 6 via the connecting passage 14, the remaining large part of the flame is propagated into the first auxiliary chamber 13a. While a extremely lean air-fuel mixture is being formed in the first auxiliary chamber 13a, particularly when the engine is operating under a light load, the flame propagating into the first auxiliary chamber 13a swirls in the first auxiliary chamber 13a together with the strong swirl motion C. As a result, the combustible mixture in the first auxiliary chamber 13a is rapidly and almost completely burned.

Figure 9:
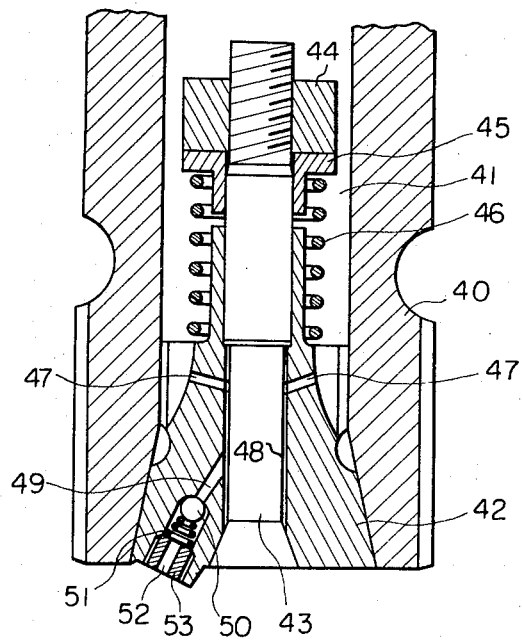
FIG. 9 is an enlarged cross-sectional side view of an alternative embodiment of a fuel injector according to the present invention.

FIG. 9 illustrates an alternative embodiment of a fuel injector according to the present invention. Referring to FIG. 9, 40 designates a housing, 41 a common fuel supply passage formed in the housing 40, 42 a valve seat screwed into the lower end of the common fuel supply passage 41 and 43 a movable needle slidably inserted into the valve seat 42; 44 designates a spring retainer fixed onto the upper end of the needle 43, 45 a spring seat, 46 a compression spring, 47 a fuel passage formed in the valve seat 42 and 48 an annular fuel passage formed between the needle 43 and the valve seat 42. An auxiliary fuel passage 49 connected to the annular fuel passage 48 is formed in the valve seat 42, and a check valve comprising a ball 50 and a compression spring 51 is inserted into the auxiliary fuel passage 49. As is illustrated in FIG. 9, the compression spring 51 is seated on a spring seat 53 which defines a fuel outlet 52 therein. In this embodiment, by appropriately setting the preloaded spring force of the compression springs 46, 51, when the engine is operating under a light load, either of the needle 43 or the check valve is caused to open, while both the needle 43 and the check valve are caused to open when the load of an engine is increased beyond a predetermined level. As will be understood from FIG. 9, since the fuel outlet 52 has a uniform cross-section over its entire length, the fuel injected from the fuel outlet 52 does not spread. Consequently, in this embodiment, there is an advantage in that the fuel injected from the fuel outlet 52 can be concentrated on a limited small area of the inner wall of the auxiliary chamber 13.

According to the present invention, the distribution of the fuel injected from the fuel injector can be controlled in accordance with changes in level of the load of an engine and, as a result, the fuel distribution which is suitable for the level of the load of the engine can be ensured. Consequently, the fuel injector according to the present invention can be applied to any type of engine, such as a direct injection type gasoline engine, a direct injection type Diesel engine and a Diesel engine having an auxiliary chamber. In the case wherein the fuel injector according to the present invention is applied to a gasoline engine having an auxilaiary chamber as illustrated in FIG. 1, the reduction in the ignition energy can be prevented and, as a result, there is an advantage that the reduction in the output power of an engine can be prevented.

While the invention has been described with reference to specific embodiments chosen for purposes of illustration, it should be apparent that numerous modifications could be made thereto by those skilled in the art without departing from the spirit and scope of the invention.

What is claimed is:

1. An internal combustion engine comprising:
   a cylinder block having a cyliner bore therein;
   a piston reciprocally movable in said cyliner bore;
   a cyliner head fixed onto said cyliner block and forming therein an auxiliary chamber having an axis, said cyliner head and said piston defining a main chamber therebetween;
   a raised portion formed on one side of an inner wall of said auxiliary chamber and dividing said auxiliary chamber into a first auxiliary chamber and a second auxiliary chamber;
   a connecting passage communicating sadi main chamber with said auxiliary chamber and tangentially connected to an inner wall of said second auxiliary chamber, which is located at a position opposite to said raised portion with respect to the axis of said auxiliary chamber;
   a spark plug arranged in a recess formed beneath said raised portion in said second auxiliary chamber, and;
   a fuel injector arranged in said first auxiliary chamber and having a first injection nozzle and a second injection nozzle, said first injection nozzle being directed to a tip of said raised portion and always injecting fuel independently of operating condition of the engine for forming a rich air-fuel mixture in said recess, said second injection nozzle injecting fuel when the load of the engine is increased beyond a predetermined level and being directed to the inner wall of said auxiliary chamber, which is located at a position opposite to said raised portion with respect to the axis of said auxiliary chamber.

2. An internal combustion engine as claimed in claim 1, wherein said raised portion extends to an approximate center of said auxiliary chamber.

3. An internal combustion engine as claimed in claim 1, wherein an auxiliary passage communicating said first auxiliary chamber with said recess is formed in said raised portion.

4. An internal combustion engine as claimed in claim 3, wherein said auxiliary passage comprises a pair of holes spaced from each other and arranged on each side of said spark plug.

5. An internal combustion engine as claimed in claim 1, wherein said first injection nozzle comprises a spring loaded first needle, said second injection nozzle comprising a spring loaded second needle.

6. An internal combustion engine as claimed in claim 5, wherein the preloaded spring force of said first needle is different from that of said second needle.

7. An internal combustion engine as claimed in claim 6, wherein the preloaded spring force of said second needle is stronger than that of said first needle.

8. An internal combustion engine as claimed in claim 7, wherein the cross-sectional opening area of said second injection nozzle is larger than that of said first injection nozzle.

9. An internal combustion engine as claimed in claim 1, wherein said first injection nozzle comprises a spring loaded needle, said second injection nozzle comprising a spring loaded check valve.

10. An internal combustion engine as claimed in claim 9, wherein the preloaded spring force of said check valve is different from that of said needle.

11. An internal combustion engine as claimed in claim 10, wherein the preloaded spring force of said check valve is stronger than that of said needle.

12. An internal combustion engine as claimed in claim 11, wherein said second injection nozzle has a fuel outlet having a uniform cross-section over its entire length.

* * * * *

UNITED STATES PATENT AND TRADEMARK OFFICE
CERTIFICATE OF CORRECTION

PATENT NO. : 4,232,638
DATED : November 11, 1980
INVENTOR(S) : Takeshi TAKAHASHI, ET AL.

It is certified that error appears in the above-identified patent and that said Letters Patent are hereby corrected as shown below:

Column 7, line 23, "cyliner" should read -- cylinder --.

Column 7, line 24, "cyliner" should read -- cylinder --.

Column 7, line 25, "cyliner" (both occurrences) should read -- cylinder --.

Column 7, line 27, "cyliner" should read -- cylinder --.

Column 7, line 33, "sadi" should read -- said --.

Signed and Sealed this

Seventeenth Day of March 1981

[SEAL]

Attest:

RENE D. TEGTMEYER

*Attesting Officer*     *Acting Commissioner of Patents and Trademarks*